United States Patent
Manganaro

(10) Patent No.: US 8,967,305 B2
(45) Date of Patent: Mar. 3, 2015

(54) DRIVE SYSTEM FOR A MOTOR VEHICLE AND METHOD THEREFOR

(76) Inventor: Carl Manganaro, Mesa, AZ (US)

( * ) Notice: Subject to any disclaimer, the term of this patent is extended or adjusted under 35 U.S.C. 154(b) by 0 days.

(21) Appl. No.: 12/800,429

(22) Filed: May 14, 2010

(65) Prior Publication Data

US 2011/0278080 A1    Nov. 17, 2011

(51) Int. Cl.
*B60K 6/10*     (2006.01)
*B60K 7/00*     (2006.01)
*B60L 11/16*    (2006.01)
*B60K 1/00*     (2006.01)

(52) U.S. Cl.
CPC .............. *B60K 7/0007* (2013.01); *B60L 11/16* (2013.01); *B60K 2001/001* (2013.01); *B60K 2007/0038* (2013.01); *B60K 2007/0092* (2013.01); *Y02T 10/7033* (2013.01); *Y02T 10/648* (2013.01)
USPC ....................................... 180/65.31; 180/165

(58) Field of Classification Search
USPC .............................................. 180/165, 65.31
See application file for complete search history.

(56) References Cited

U.S. PATENT DOCUMENTS

| | | | |
|---|---|---|---|
| 3,379,008 A | | 4/1968 | Manganaro |
| 3,496,799 A | * | 2/1970 | Call ............................ 74/572.11 |
| 3,665,788 A | * | 5/1972 | Nyman .............................. 475/72 |
| 3,672,244 A | * | 6/1972 | Nasvytis ............................ 477/37 |
| 3,870,116 A | * | 3/1975 | Seliber ............................ 180/165 |
| 4,028,962 A | * | 6/1977 | Nelson ......................... 74/572.12 |
| 4,282,948 A | * | 8/1981 | Jerome ........................... 180/165 |
| 4,408,500 A | * | 10/1983 | Kulkarni et al. ............ 74/572.12 |
| 4,423,794 A | * | 1/1984 | Beck ............................... 180/165 |
| 4,458,156 A | * | 7/1984 | Maucher et al. ............. 290/38 B |
| 4,532,769 A | * | 8/1985 | Vestermark ...................... 60/698 |
| 5,244,054 A | * | 9/1993 | Parry .............................. 180/165 |
| 5,568,023 A | * | 10/1996 | Grayer et al. .................. 318/139 |
| 5,798,593 A | * | 8/1998 | Salter et al. .................... 310/166 |
| 5,828,137 A | * | 10/1998 | Selfors et al. .................... 290/52 |
| 5,925,993 A | * | 7/1999 | Lansberry ...................... 318/139 |
| 6,082,476 A | | 7/2000 | Stulbach |
| 6,122,993 A | * | 9/2000 | Morris et al. ............... 74/572.11 |
| 6,758,295 B2 | * | 7/2004 | Fleming ......................... 180/165 |
| 6,962,223 B2 | * | 11/2005 | Berbari ......................... 180/165 |
| 7,416,039 B1 | * | 8/2008 | Anderson et al. ............. 180/165 |
| 7,624,830 B1 | * | 12/2009 | Williams ....................... 180/165 |
| 7,654,355 B1 | * | 2/2010 | Williams ....................... 180/165 |
| 7,854,278 B2 | * | 12/2010 | Kaufman ........................ 180/2.2 |
| 2007/0163828 A1 | | 7/2007 | Manganaro |
| 2008/0308335 A1 | * | 12/2008 | Anderson et al. ............. 180/165 |
| 2009/0071734 A1 | * | 3/2009 | Hurkett ....................... 180/65.31 |
| 2010/0084999 A1 | * | 4/2010 | Atkinson, Jr. ................. 318/139 |

\* cited by examiner

*Primary Examiner* — Jeffrey J Restifo
(74) *Attorney, Agent, or Firm* — Schmeiser, Olsen & Watts LLP

(57) ABSTRACT

An apparatus for generating an electric current to drive a vehicle has at least one electric drive motor coupled to each rear wheel of the vehicle. The electric motors are used to drive each rear wheel. A motor controller is coupled to each electric motor. Kinetic energy converting generators power the electric drive motor. Optionally, a flywheel is coupled to an electrical generator which is electrically coupled to the motor controller. Also optionally, at least one kinetic energy converting generator may be coupled to at least one of the vehicle wheels in order to convert kinetic energy of the vehicle into electrical energy to power the drive motor, via the motor controller.

3 Claims, 5 Drawing Sheets

DRIVE SYSTEM FOR A MOTOR VEHICLE AND METHOD THEREFOR

FIELD OF INVENTION

The present invention relates to a drive system for vehicles and more specifically, to drive system for electrically powered vehicles. Even more specifically, the present invention relates to a drive system for electrically powered vehicles that utilize regenerative powering of electrical drive motors.

BACKGROUND OF INVENTION

Electrically powered drive systems are among the oldest drive systems for vehicles. Electric vehicles first came into existence in the early-19th century, when electricity was among the preferred methods for automobile propulsion, providing a level of comfort and ease of operation that could not be achieved by the gasoline cars of the time. In time the internal combustion engine came to replace electric motors for vehicle drive systems.

Electrically powered vehicles utilize electric motors, generally, are powered by either an alternating current (AC) or a direct current (DC) power source and do not directly utilize gasoline or diesel fuels.

One requirement of electric motors is the need for an energy storage system to provide continuous power to the motors. One solution has been to use one or more batteries to power the electric motors. These batteries may store either chemical energy or kinetic energy.

Chemical batteries have to be periodically or continuously recharged in order to fully power the electric vehicle. Current batteries also only have a limited number of times in which they may be recharged. Once a battery can no longer be recharged, it must be replaced.

A popular type of potential energy battery is a flywheel. A flywheel, properly maintained, has an almost unlimited lifespan, which is not dependent upon the number of charge and discharge cycles. Furthermore, flywheels have a fast recharge time as compared to batteries. A large chemical battery may take several hours to recharge, while a flywheel may take minutes.

While present systems for driving electric powered vehicles do currently work, they have several problems. One such problem is that most electric vehicles are driven by a single electric motor. A single electric motor fails to provide sufficient power to satisfy most consumers. Most electric vehicles have a fairly slow acceleration rate when the driver presses on the acceleration pedal. Another problem is that much of the kinetic energy of the moving vehicle is wasted and therefore lost to reuse by the drive motors.

Therefore, there is still a continuing need for improved electrical drive systems for vehicles.

SUMMARY OF INVENTION

It is an object of the present invention to provide an electrically powered drive system for vehicles.

It is another object of the present invention to provide a drive system for electric vehicles that utilized at least one kinetic power conversion to power drive motors.

It is yet another object of the present invention to provide a drive system for electric vehicles that utilizes both the kinetic energy of a flywheel and the kinetic energy of the moving vehicle to help drive the vehicle.

It is still yet another object of the present invention to provide a drive system for an electric vehicle where a flywheel is coupled with a drive motor, where the flywheel's rotation powers the drive motor. In addition, additional electrical generators are coupled to the drive motor, where the additional electrical generators also power the drive motor.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention (s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DETAILED DESCRIPTION

The present invention is a drive system for a vehicle. In one embodiment, the drive system utilizes at least one electrical generator to convert the kinetic energy of the moving vehicle into electrical energy to help drive the vehicle. In another embodiment, the drive system utilizes at least one electrical generator to convert the kinetic energy of a moving flywheel into electrical energy to help drive the vehicle. In yet another embodiment, the drive systems utilizes at least two electrical generators, at least one electrical generator to convert the kinetic energy of the moving vehicle into electrical energy and at least one electrical generator to convert the kinetic energy of a moving flywheel into electrical energy, both of which, help drive the vehicle.

Figure 1:
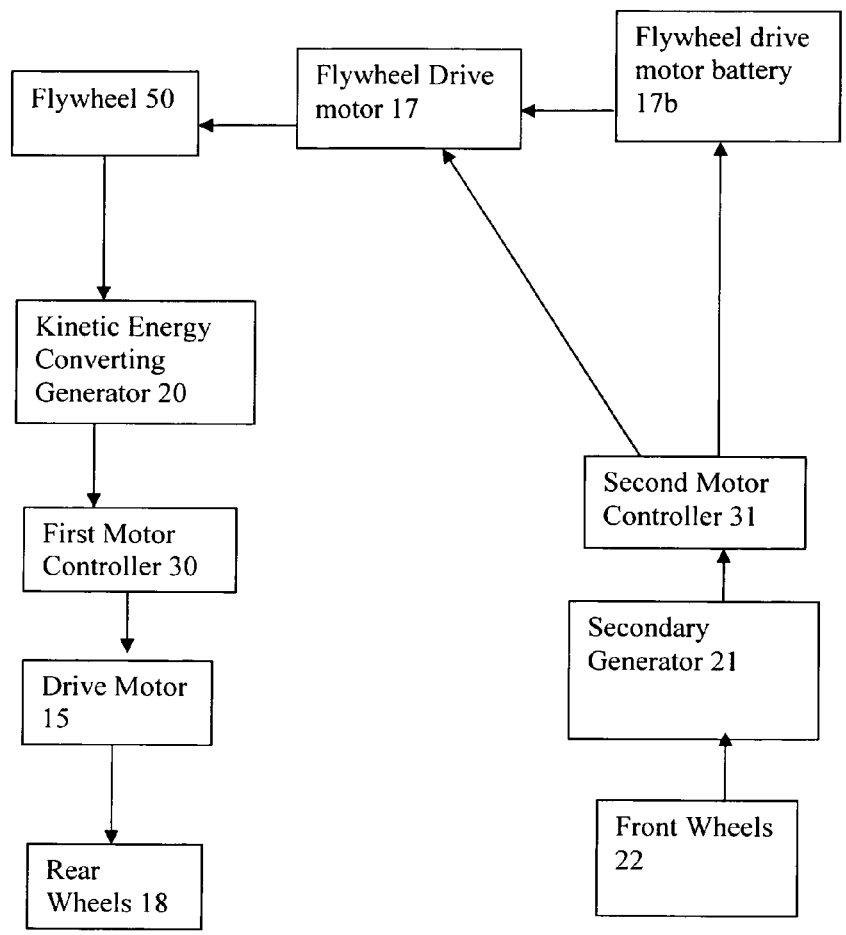
FIG. 1 is a simplified block diagram of the drive system of the present invention.
Figure 2:
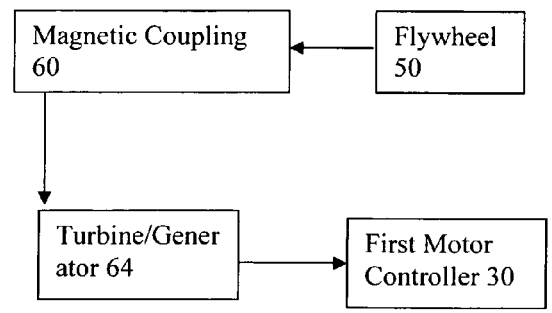
FIG. 2 is a simple block diagram of the kinetic energy converting generator according to the present invention.

FIG. 1 illustrates a block diagram of the drive system 10 of the present invention. The drive system 10 comprises at least one drive motor 15 that drives the vehicle. In a preferred embodiment there are at least two drive motors 15, each located couples directly on a wheel on opposite sides of the vehicle. In another preferred embodiment, there is only one drive motor 15, which is coupled directly to a transmission that is mechanically coupled to at least one drive wheel. In the present invention, the electric drive motors 15 are located at rear wheels 18 creating a more efficient and powerful system. When current is supplied, the motors 15 drive the vehicle by rotating the rear wheels 18 respectively.

In a preferred embodiment, the drive system 10 also comprises a flywheel 50 that stores kinetic energy used by the system through constant rotation. The flywheel 50 is run up using a flywheel drive motor 17 that is run off a flywheel drive motor battery 17b. The drive motor 17 starts the initial rotation of the flywheel 50 until it reaches maximum speed. Alternatively, an A/C outlet 51 can also start the rotation of the flywheel 50. Through the A/C outlet 51, the motor vehicle could be connected to a charging station or an electrical outlet of one's home to charge the flywheel 50. Both of these methods could be implemented in the flywheel drive system allowing the vehicle operator many options to start his vehicle.

The drive system 10 also comprises at least one first kinetic energy converting generator 20 mechanically connected to the flywheel 50 that converts kinetic energy from the flywheel 50 into electrical energy to drive the vehicle. Each of the at least one first kinetic energy converting generators 20 is electrically connected to the at least one drive motor 15.

In the preferred embodiment, the first kinetic energy converting generator 20 is a high speed axial flow generator 20' which is magnetically coupled 60 to the flywheel 50.

The magnetic coupling 60 has first and second back plates, each of which have complementary north and south pole sections. The first back plate is attached to the flywheel and the second back plate is attached to the high speed axial flow generator. Thus, by engaging the two back plates, kinetic energy is transferred from the flywheel 50 to a generator 64.

Interposed between the first kinetic energy conversion motors 20 and the drive motors 15 is at least one motor controller 30, which regulates current going into the drive motors 15. It is preferably a solid-state device that uses a pulse width modulator (PWM) that sends short bursts of current to the motor at a rate of 15 kHz Also shown in FIG. 1, the system 10 includes at least one secondary generator 21. Preferably, at least one of the secondary generators 22 is coupled to each of the front wheels 22. As the vehicle is in motion, the front wheels 22 rotate. The rotation of the front wheels 22 spin the secondary generators 21 located at each of the front wheels 22. Thus while spinning, each generator 21 supplies electric current to a second motor controller 31, which regulates the current that goes to the flywheel drive motor battery 17'. As a result, energy recovered from the front wheels 22 can be used to increase the spin up the flywheel 50. In a preferred embodiment, an intelligent charger interposed between the secondary generators 21 and the flywheel drive motor battery 17' and is used to monitor the battery's voltage, temperature and/or time under charge to determine the optimum charge current at that instant. Charging is terminated when a combination of the voltage, temperature and/or time indicates that the battery 17' is fully charged.

To achieve a desired speed, motor controller 30 is controlled by a throttle that manages the current from the motor controller 30 to the electric motors 15. The level of current will either cause the vehicle to increase, decrease or maintain a constant speed.

Figure 3A:
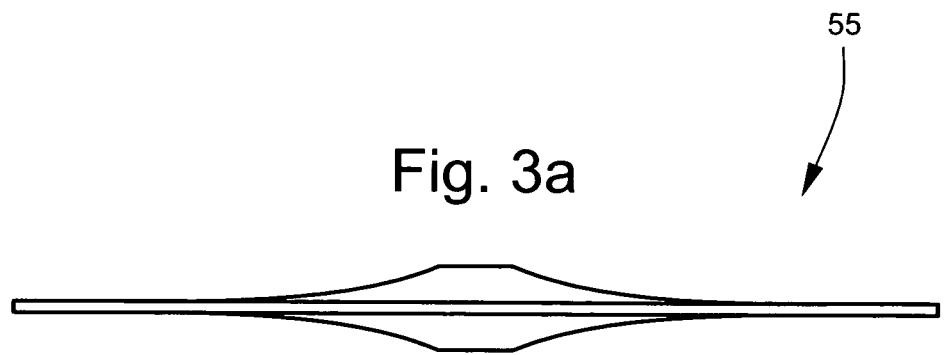
FIG. 3a and b illustrates preferred flywheels according to the present invention.
Figure 3B:
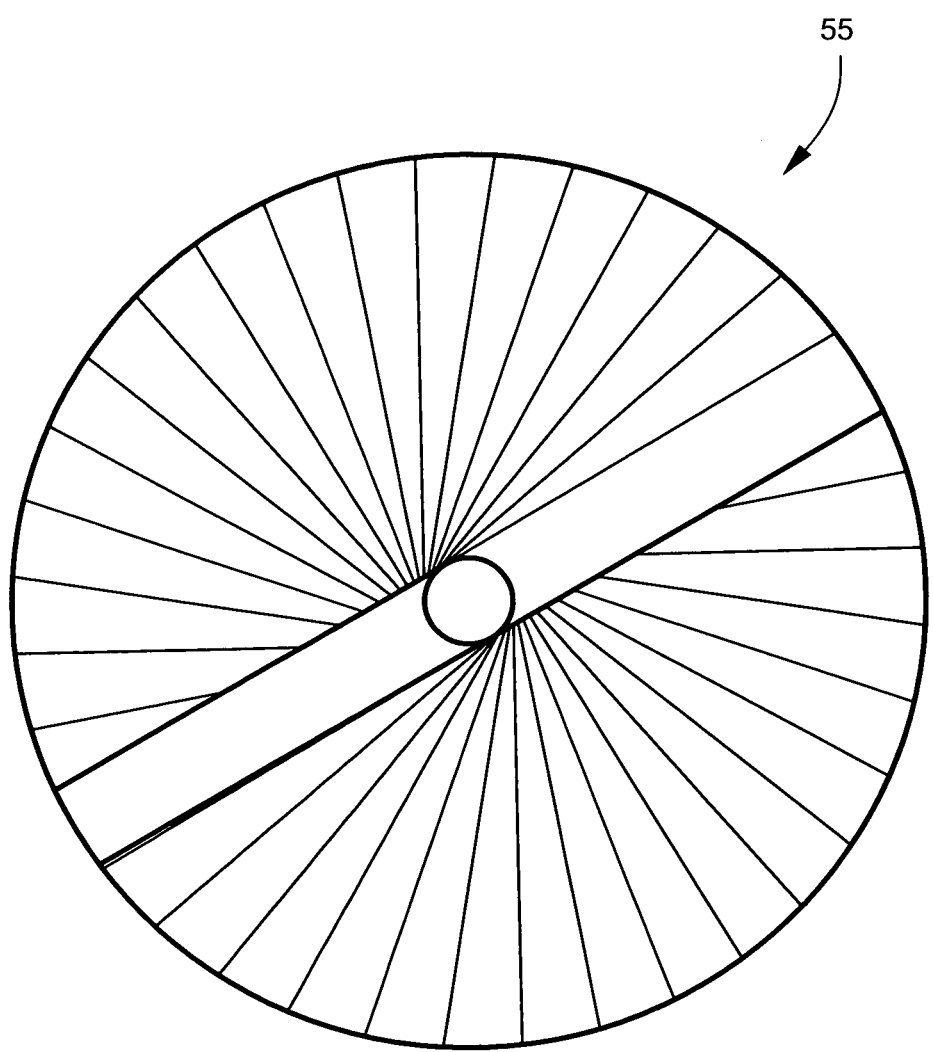
Figure 4:
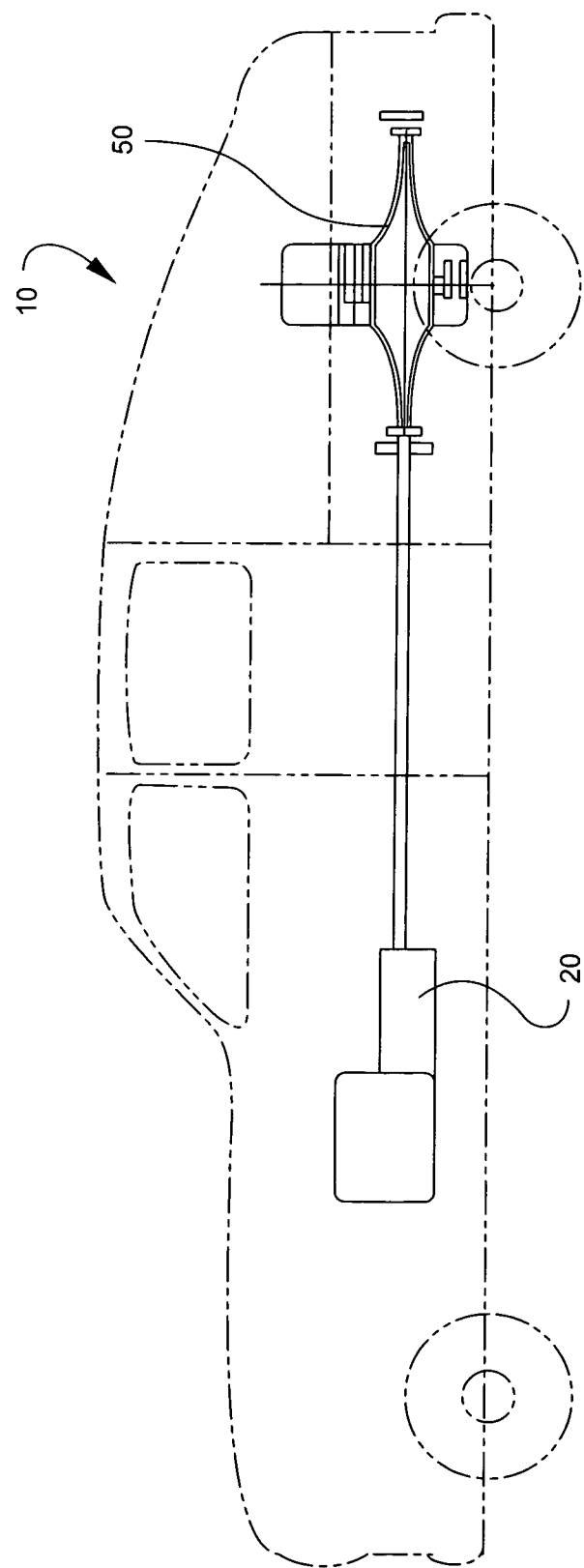
FIG. 4 is a side view illustrating the drive system of the present invention in a vehicle.
Figure 5:
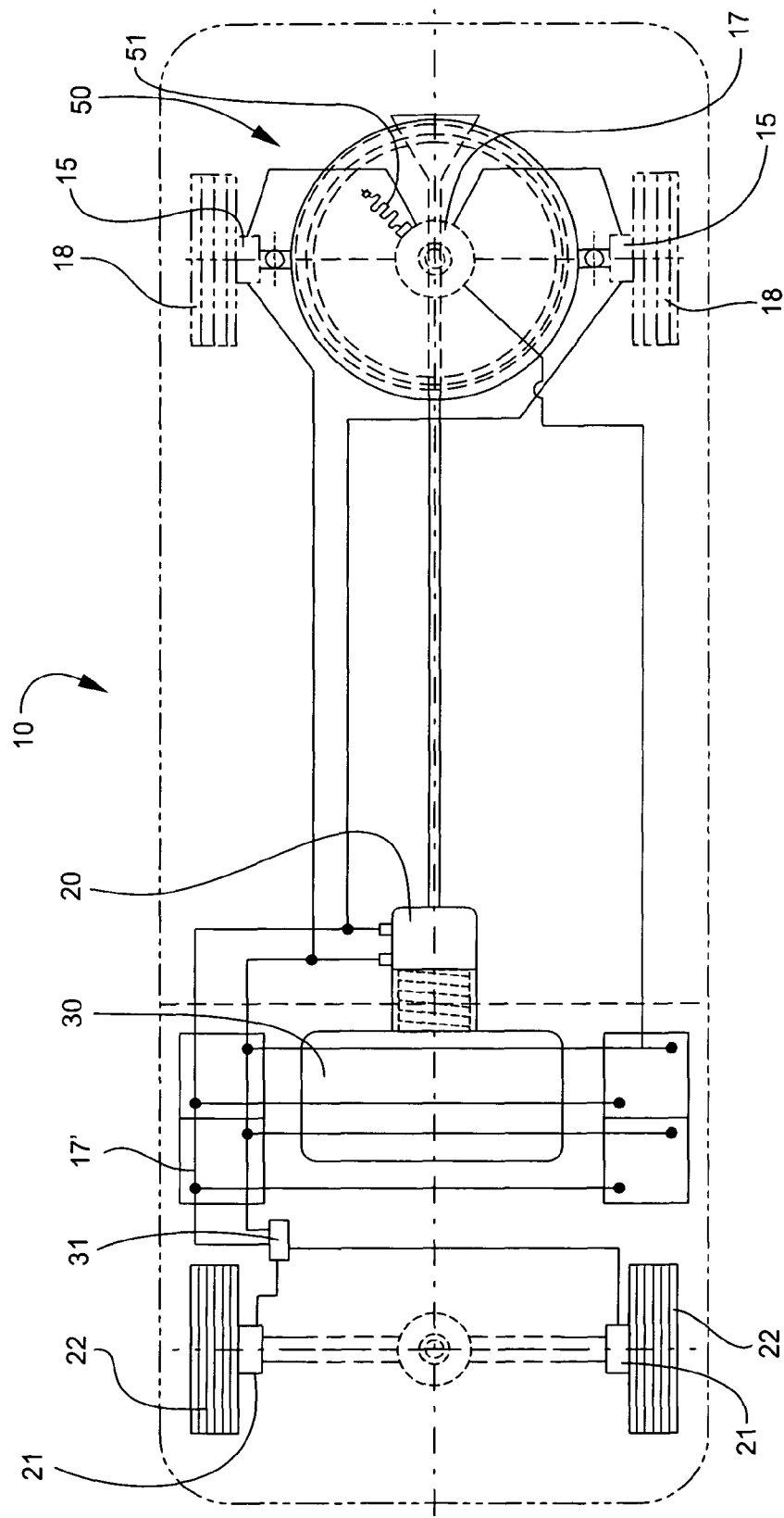
FIG. 5 is a top view illustrating the drive system of the present invention in a vehicle.

FIG. 3 is an illustration of the preferred flywheel 50 according to the present invention. Like any other flywheel, the instant flywheel performance will be directly proportional to the specific strength of the material used in its construction.

In a preferred embodiment, the flywheel 50 is made of a plurality of high tensile strength, straight filaments. In an alternate embodiment, the flywheel 50 of the instant invention may be made of a plurality of high tensile strength strips. The shape is a disk with a cross section in the shape of a cissoid; more preferably, a conchoids; most preferably, a conchoids where the distance between a fixed point and another curve is approximately equal to the distance between the two curves.

To obtain the equation to the curve, let 0 be a fixed point and BC a fixed straight line; draw any line through 0 intersecting BC in P and take on the line PO two points X, X', such that PX=PX'=a constant quantity. Then the locus of X and X' is the conchoids. Draw AO perpendicular to BC, and let A0=a; let the constant quantity PX=PX'=b. Then taking 0 as pole and a line through 0 parallel to BC as the initial line, the polar equation is $r = a \csc B \pm b$, the upper sign referring to the branch more distant from O. The Cartesian equation with A as origin and BC as axis of x is $x^2 y^2 = (a+y)^2 (b^2 - y^2)$. Both branches belong to the same curve and are included in this equation. The most preferred equation is where $a \approx b$. This shape give an optimized strength to energy storage density.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A drive system for a vehicle operated by a flywheel, comprising;
    a starter storage battery or alternating current outlet, electrically connected to a flywheel motor;
    a flywheel mechanically connected to the flywheel motor;
    a generator mechanically connected to the flywheel;
    a motor controller electrically connected to the generator;
    two drive motors electrically connected to the motor controller and mechanically connected to two rear wheels, respectively, and wherein there is no intervening mechanical linkage between the flywheel and the two rear wheels;

two generator motors mechanically connected to two front wheels, respectively, and electrically connected to the motor controller and the starter storage battery;

an intelligent charger interposed between the two generator motors and the starter storage battery, which is used to monitor the battery's voltage, temperature, and/or time under charge;

a throttle connected to the motor controller, said throttle able to manage the current from the motor controller to the two drive motors;

wherein the flywheel has the shape of a disk with a cross section in the shape of a cissoid.

2. The drive system according to claim 1 wherein the flywheel has the shape of a disk with a cross section in the shape of a conchoids.

3. The drive system according to claim 1 wherein the flywheel has the shape of a disk with a cross section in the shape of a conchoids, a first curve, where the distance between a fixed point and a second curve is approximately equal to the distance between the two curves.

\* \* \* \* \*